United States Patent
Wu et al.

(10) Patent No.: US 10,545,807 B2
(45) Date of Patent: Jan. 28, 2020

(54) METHOD AND SYSTEM FOR ACQUIRING PARAMETER SETS AT A PRESET TIME INTERVAL AND MATCHING PARAMETERS TO OBTAIN A FAULT SCENARIO TYPE

(71) Applicant: China Construction Bank Corporation, Beijing (CN)

(72) Inventors: Dawei Wu, Beijing (CN); Weijie An, Beijing (CN); Huaiyi Xin, Beijing (CN); Yuan He, Beijing (CN); Tao Gu, Beijing (CN)

(73) Assignee: China Construction Bank Corporation, Beijing (CN)

( * ) Notice: Subject to any disclaimer, the term of this patent is extended or adjusted under 35 U.S.C. 154(b) by 222 days.

(21) Appl. No.: 15/388,865

(22) Filed: Dec. 22, 2016

(65) Prior Publication Data

US 2017/0132063 A1    May 11, 2017

Related U.S. Application Data

(63) Continuation of application No. PCT/CN2015/098824, filed on Dec. 25, 2015.

(30) Foreign Application Priority Data

Nov. 10, 2015 (CN) .......................... 2015 1 0763286

(51) Int. Cl.
  *G06F 11/30* (2006.01)
  *G06F 11/07* (2006.01)
  *H04L 29/06* (2006.01)

(52) U.S. Cl.
  CPC ...... *G06F 11/0751* (2013.01); *G06F 11/0778* (2013.01); *G06F 11/0781* (2013.01);
  (Continued)

(58) Field of Classification Search
  CPC ............ G05B 23/0235; G05B 23/0218; G05B 23/0243; G05B 23/0245; G05B 23/0254;
  (Continued)

(56) References Cited

U.S. PATENT DOCUMENTS 4,922,491 A *  5/1990  Coale .................. G06F 11/0745
                                              714/26
7,509,539 B1 * 3/2009  Denefleh ............. G06F 11/0709
                                              714/38.1
(Continued)

FOREIGN PATENT DOCUMENTS

CN       101556679        10/2009
CN       103368771        10/2013
(Continued)

OTHER PUBLICATIONS

State Intellectual Property Office of China, First Office Action and Search Report Issued in International Application No. 201510763286.3, dated Jan. 11, 2018, 20 pp.
(Continued)

*Primary Examiner* — Joseph O Schell
(74) *Attorney, Agent, or Firm* — Fitch, Even, Tabin & Flannery LLP

(57) ABSTRACT

The present disclosure discloses a fault scenario information collecting method and system for an information system, which regularly acquire information of each parameter of a first preset parameter set in the information system at a preset time interval, monitor operating states of the information system to judge whether a fault occurs in the operating states of the information system, and acquire information of each parameter of a second preset parameter set in the information system when the fault occurs in the operating states of the information system.

7 Claims, 4 Drawing Sheets

(52) U.S. Cl.
CPC .......... *G06F 11/0787* (2013.01); *G06F 11/30* (2013.01); *G06F 11/3051* (2013.01); *H04L 63/1416* (2013.01); *H04L 63/1425* (2013.01)

(58) Field of Classification Search
CPC ............... G06F 11/079; G06F 11/0778; G06F 11/3051; H04L 63/1416; H04L 63/1425
See application file for complete search history.

(56) References Cited

U.S. PATENT DOCUMENTS

| | | | | |
|---|---|---|---|---|
| 8,307,435 | B1* | 11/2012 | Mann | G06F 21/566 714/38.1 |
| 2002/0152305 | A1* | 10/2002 | Jackson | H04L 41/5035 709/224 |
| 2005/0222819 | A1* | 10/2005 | Boss | G06Q 10/06 702/186 |
| 2006/0211415 | A1* | 9/2006 | Cassett | H04W 24/04 455/423 |
| 2008/0010531 | A1* | 1/2008 | Hendler | G05B 23/0281 714/33 |
| 2010/0204960 | A1* | 8/2010 | Hagadone | G06F 11/3006 702/188 |
| 2010/0318846 | A1* | 12/2010 | Sailer | G06F 11/0748 714/26 |
| 2013/0047038 | A1* | 2/2013 | Huang | G06F 11/0748 714/38.1 |
| 2013/0297603 | A1* | 11/2013 | Brenker | G06F 11/3006 707/737 |
| 2013/0305093 | A1* | 11/2013 | Jayachandran | G06F 11/0754 714/37 |
| 2014/0075239 | A1 | 3/2014 | Prathipati | |
| 2015/0149541 | A1 | 5/2015 | Kanjirathinkal | |
| 2015/0178634 | A1* | 6/2015 | Chen | G06Q 10/10 706/12 |

FOREIGN PATENT DOCUMENTS

| | | |
|---|---|---|
| CN | 103929320 | 7/2014 |
| EP | 1733506 | 10/2005 |
| EP | 1733506 B1 | 12/2006 |

OTHER PUBLICATIONS

Yen, et al, Gary G., "Improving the Performance of Globalized Dual Heuristic Programming for Fault Tolerant Control Through an Online Learning Supervisor", IEEE Transactions on Automation Science and Engineering, Apr. 11, 2005, Abstract p. 126, 1 p.

European Patent Office, Communication Under Rule 71(3) EPC (Intention to Grant) issued in Corresponding Application No. 15 893 168.3 and accompanying grant document, dated Mar. 9, 2018, 32 pp.

Delima P. G. et al., Improving the Performance of Globalized Dual Heuristic Programming for Fault Tolerant Control Through an Online Learning Supervisor, IEEE Transactions on Automation Science and Engineering, vol. 2, Apr. 30, 2005, 11 pp.

European Patent Office, Extended Search Report, Supplementary European Search Report and European Search Opinion Issued in Application No. 15893168.3, dated Apr. 3, 2017, 8 pp.

ip.com Inc., ip.com Journal, Repeatable Failure Data Capture—Framework to Aid in Root Cause Analysis, Jul. 25, 2014, 2 pp.

State Intellectual Property Office of China, Second Office Action Issued in International Application No. 201510763286.3, dated Aug. 8, 2018, 14 pp.

International Search Report Issued in International Application No. PCT/CN2015098824, dated Aug. 2, 2016, 2 pp.

* cited by examiner

METHOD AND SYSTEM FOR ACQUIRING PARAMETER SETS AT A PRESET TIME INTERVAL AND MATCHING PARAMETERS TO OBTAIN A FAULT SCENARIO TYPE

CROSS-REFERENCE TO RELATED APPLICATIONS

This application is a continuation of International Application No. PCT/CN2015/098824, filed on Dec. 25, 2015, which claims priority to Chinese Patent Application No. 201510763286.3, filed on Nov. 10, 2015, both of which are hereby incorporated by reference in their entireties.

FIELD

The present disclosure relates to the technical fields of information collection, particularly, relating to a fault scenario information collecting method and system for an information system.

BACKGROUND

The fault scenario information collection for an information system is of vital importance to the subsequent fault reason analysis of the information system. Due to the contingency, temporality and complexity of faults occurring in the information system, it is difficult to reproduce faults or analyze and locate fault matter if the fault information cannot be collected comprehensively and timely for the scenarios when faults occur in the information system.

Recently, due to the lack of a tool for collecting the corresponding fault scenario information, operator of the information system generally collects the fault information manually. However, due to a difference existing in technical skills of the operator and the demands of timely resuming production in case that faults occur during production, there frequently arise problems that the fault scenario information is collected neither comprehensively nor timely and the like when faults occur in the information system, which leads to scarcity of key information, thereby the information collected under the information system fault scenario in the prior art not satisfying the demands of the subsequent analysis of the fault matters.

SUMMARY

In order to solve the above technical problems, some embodiments of the present disclosure provides a fault scenario information collecting method and system for the information system to timely and comprehensively collect the information of the fault scenario in the information system and meet the demands of subsequently analyzing and locating the fault matters.

To solve the above problems, embodiments of the present disclosure provide the following technical solutions.

A fault scenario information collecting method for an information system, including:
  regularly acquiring information of each parameter of a first preset parameter set in the information system at a preset time interval;
  monitoring operating states of the information system to judge whether a fault occurs in the operating states of the information system; and
  acquiring information of each parameter of a second preset parameter set in the information system when the fault occurs in the operating states of the information system.

Optionally, the acquiring information of each parameter of the second preset parameter set in the information system when the fault occurs in the operating states of the information system includes:
  matching the information for the fault with a preset information to obtain a preset fault scenario type corresponding to the information for the fault when the fault occurs in the operating states of the information system;
  acquiring, according to the fault scenario type corresponding to the information for the fault, the information of each parameter of the second preset parameter set corresponding to the fault scenario type.

Optionally, the method further includes: matching the information for the fault with the preset information, and adding a fault scenario type corresponding to the information for the fault to which no preset fault scenario type corresponding is obtained.

Optionally, the preset time interval ranges from 1 min to 5 min in terms of value, including end values.

Optionally, this method further includes:
  storing the acquired information of each parameter of the first preset parameter set and that of each parameter of the second preset parameter set.

A fault scenario information collecting system for an information system adopting any one of the above fault scenario information collecting method for the information system, including:
  a first acquiring module for regularly acquiring information of each parameter of a first preset parameter set in the information system at a preset time interval;
  a monitoring module for monitoring operating states of the information system to judge whether a fault occurs in the operating states of the information system; and
  a second acquiring module for acquiring information of each parameter of a second preset parameter set in the information system when the fault occurs in the operating states of the information system.

Optionally, the second acquiring module includes:
  an information matching unit for matching the information for the fault with a preset information to obtain a preset fault scenario type corresponding to the information for the fault when the fault occurs in the operating states of the information system, wherein a plurality of fault scenario types and their corresponding preset information are set in the information matching unit in advance;
  an information collecting unit for acquiring, according to the fault scenario type corresponding to the information for the fault, the information of each parameter of the second preset parameter set corresponding to the fault scenario type.

Optionally, the second acquiring module further includes:
  an information prompting unit for matching the information for the fault with the preset information, issuing a prompting information when no preset fault scenario type corresponding to the information for the fault is obtained, wherein the prompting information is used for prompting that there is no fault scenario type corresponding thereto in the current system.

Optionally, the second acquiring module further includes:
  an information supplement unit for collecting the information for the current fault, to which no fault scenario type corresponds, in the current system when the fault occurs in the information system; summarizing and reorganizing the information for the current fault so as to be a new fault scenario type corresponding thereto, and adding it to the information matching unit.

Optionally, the system further includes:

a storing module for storing the acquired information of each parameter of the first preset parameter set and that of each parameter of the second preset parameter set.

Compared with the prior art, the above technical solutions have the following advantages.

The fault scenario information collecting method and system for the information system provided by the embodiments of the present disclosure regularly acquires information of each parameter of the first preset parameter set in the information system at the preset time interval, monitors operating states of the information system to judge whether a fault occurs in the operating states of the information system, and acquires information of each parameter of the second preset parameter set in the information system when the fault occurs in the operating states of the information system. As such, the fault scenario information collecting method and system for the information system provided by the embodiments of the present disclosure acquires the information of each parameter of the first preset parameter set in the information system at the preset time interval, and automatically acquires the information of each parameter of the second preset parameter set in the information system when the fault occurs in the operating states of the information system, without manual intervention and acquisition, thereby ensuring that the information is collected comprehensively and timely, so as to meet the demands of subsequently analyzing and locating the fault matters, and avoiding the risks of misoperation occurring during the manual information acquisition in emergency circumstances.

BRIEF DESCRIPTION OF THE DRAWINGS

In order to more clearly explain the embodiments of the present disclosure or the technical solution of the prior art, the drawings to be used for describing the embodiments or the prior art are briefly introduced as follows. Obviously, the drawings in the following description are only some examples of the present disclosure, and a person skilled in the art could further obtain other drawings from these drawings without contributing any creative work.

DETAILED DESCRIPTION OF THE EMBODIMENTS

Figure 1:
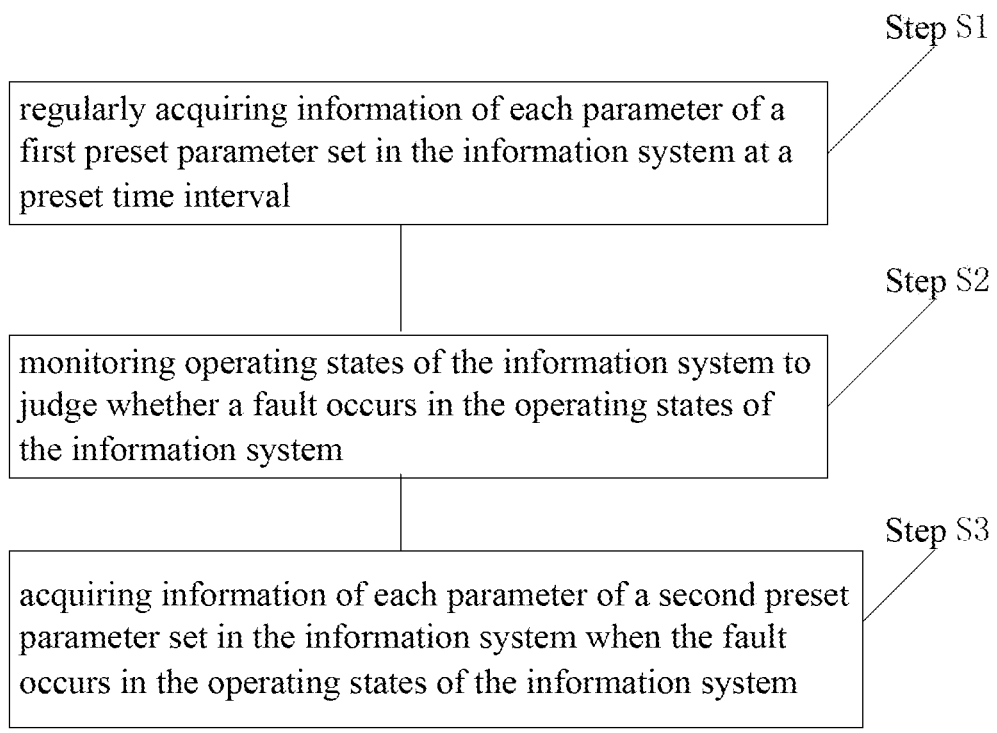
FIG. 1 is a schematic flow chart of the fault scenario information collecting method for the information system provided by one embodiment of the present disclosure.

As stated in the portion of background, the information collected under the information system fault scenario in the prior art cannot satisfy the demands of subsequently analyzing the fault matters.

In view of this, one embodiment of the present disclosure provides a fault scenario information collecting method for an information system, including:

regularly acquiring information of each parameter of a first preset parameter set in the information system at a preset time interval;

monitoring operating states of the information system to judge whether a fault occurs in the operating states of the information system;

acquiring information of each parameter of a second preset parameter set in the information system when the fault occurs in the operating states of the information system.

Correspondingly, one embodiment of the present disclosure further provides a fault scenario information collecting system for an information system adopting the above information system fault scenario information collecting method, the collecting system including:

a first acquiring module for regularly acquiring information of each parameter of a first preset parameter set in the information system at a preset time interval;

a monitoring module for monitoring operating states of the information system to judge whether a fault occurs in the operating states of the information system;

a second acquiring module for acquiring information of each parameter of a second preset parameter set in the information system when the fault occurs in the operating states of the information system.

With the fault scenario information collecting method and system for the information system provided by the embodiments of the present disclosure, information of each parameter of the first preset parameter set in the information system is acquired at the preset time interval, and information of each parameter of the second preset parameter set in the information system is automatically acquired when the fault occurs in the operating states of the information system, without manual intervention and acquisition, thereby ensuring that the information is collected comprehensively and timely so as to satisfy the demands of subsequently analyzing and locating the fault matters, and avoiding the risks of misoperation occurring during the manual information acquisition in emergency circumstances.

The above is the core idea of the present disclosure, and the following will clearly and completely describe the technical solutions in the embodiments of the present disclosure in combination with the drawings in the embodiments of the present disclosure. Obviously, the described embodiments are just one part of the embodiments of the present disclosure rather than all the embodiments. Based on the embodiments of the present disclosure, all the other embodiments obtained by a person skilled in the art without contributing any creative work shall fall within the protection scope of the present disclosure.

In the following description, many supporting details are set out to fully understand the present disclosure, but the present disclosure may also be implemented by other ways different from what is described here. Persons skilled in the art may similarly analogize without departing from the spirit of the present disclosure. Therefore, the present disclosure is not limited by the following disclosed embodiments.

Some embodiments of the present disclosure provide a fault scenario information collecting method for an information system. As shown in FIG. 1, the method includes the steps as follows.

Step S1: regularly acquiring information of each parameter of a first preset parameter set in the information system at the preset time interval.

It needs to explain that in the embodiments of the present disclosure, information of each parameter of the first preset parameter set is acquired regularly in the information system at the preset time interval regardless of whether a fault occurs in the information system. In one specific example of the present disclosure, the first preset parameter set includes: operating system information and weblogic information and the like, wherein the operating system information includes: running process information, resource occupancy situation information, network card usage information and the number of the opened files corresponding to each system process in the information system; the weblogic information includes: service process information, garbage recycling log information, service log information, JVM information and the like. The present disclosure does not limit the above but does it as appropriate.

It further needs to explain that in the embodiments of the present disclosure, as an abbreviation of Java Virtual Machine, JVM is a specification for a computing apparatus, a virtual computer, and is implemented by simulating various computer functions on an actual computer in an analogue manner. As a middleware based on a JAVAEE architecture, WebLogic is a Java application server for developing, integrating, deploying and managing a large-scale distributed Web application, network application and database application. Since JVM and WebLogic are known to persons skilled in the art, it is not described in a detailed manner herein in the present disclosure.

On any one of the above embodiments basis, in one preferable example of the present disclosure, the preset time interval ranges from 1 min to 5 min in terms of value, including end values. However, the present disclosure does not limit the above but does it as appropriate, as long as the preset time interval is smaller than the time interval from the time point when the fault occurs in the information system to the time point when the operation of the information system restarts, thereby ensuring that information of each parameter in the first preset parameter set at the fault occurring timing may be acquired when faults occurs in the information system.

Step S2: monitoring operating states of the information system to judge whether the fault occurs in the operating states of the information system.

It needs to explain that in the embodiments of the present disclosure, when the information system is in the operating states, it needs to fully monitor the operating states of the information system. In one embodiment of the present disclosure, the step S2 of monitoring operating states of the information system to judge whether the fault occurs in the operating states of the information system includes:

monitoring operating states of the information system to judge whether abnormality occurs in the operating states of the information system;

acquiring information on the abnormality occurring in the information system when the abnormality occurs in the operating states of the information system;

judging whether the information on the abnormality occurring in the information system satisfies a preset condition; and determining that the fault occurs in the operating states of the information system where the information on the abnormality occurring in the information system satisfies the preset condition.

It further needs to explain that in the embodiments of the present disclosure, the preset condition may be whether the processor occupancy rate of the information system exceeds a threshold, or may be whether a key word exists in the error log of the information system, and may be other judging conditions, or meanwhile include a plurality of judging conditions. The present disclosure does not limit the above but does it as appropriate.

Step S3: acquiring information of each parameter of a second preset parameter set in the information system when the fault occurs in the operating states of the information system.

In one preferable example of the present disclosure, the step S3 of acquiring information of each parameter of the second preset parameter set in the information system when the fault occurs in the operating states of the information system includes:

step S301: matching the information for the fault with a preset information to obtain a preset fault scenario type corresponding to the information for the fault when the fault occurs in the operating states of the information system; and step S302: acquiring, according to the fault scenario type corresponding to the information for the fault, information of each parameter of the second preset parameter set corresponding to the fault scenario type.

On the above embodiments basis, in one example of the present disclosure, the method further includes:

step S303: matching the information for the fault with the preset information, issuing a prompting information when no preset fault scenario type corresponding to the information for the fault is obtained, wherein the prompting information is used for prompting the operator that the fault occurs in the information system and there is no fault scenario type corresponding thereto in the information system, thereby failing to automatically collect the information for the fault. In another example of the present disclosure, the method further includes: matching the information for the fault with the preset information, and adding a fault scenario type corresponding to the information for the fault to which no preset fault scenario type corresponding is obtained, thereby supplementing the preset fault scenario types, timely and comprehensively collecting all fault scenario information possibly occurring in the information system as much as possible, and strongly supporting the subsequent analysis and location of the fault matters.

On any one of the above embodiments basis, in one example of the present disclosure, the second preset parameter set includes: application log information and application configuration information and the like of the fault scenario type. The present disclosure does not limit the above but does it as appropriate. As in one specific example of the present disclosure, when the service downtime or failure of weblogic service port of the information system is monitored, the second preset parameter set includes: backup of the application log of the service port, whether dump (dump is used for showing a java thread pool performing a thread function calling relationship) occurs in the service port, backup dump file (saving the operating states of the system process, for debugging a driving program by a person who writes the driving program), and the like.

It needs to explain that in the embodiments of the present disclosure, the type of the parameters in the second preset parameter set for different preset fault scenario types may be the same or different. The present disclosure does not limit the above but does it as appropriate to ensure that the information is collected in a manner targeted for the fault scenario type corresponding to the occurred fault, thereby realizing rapid and effective collection of the information for the fault.

It further needs to explain that in the embodiments of the present disclosure, when the fault occurs in the operating states of the information system, the acquisition of the information of each parameter of the first preset parameter set and that of the information of each parameter of the second preset parameter set may be performed concurrently, or successively. The present disclosure does not limit the above but does it as appropriate.

Figure 2:
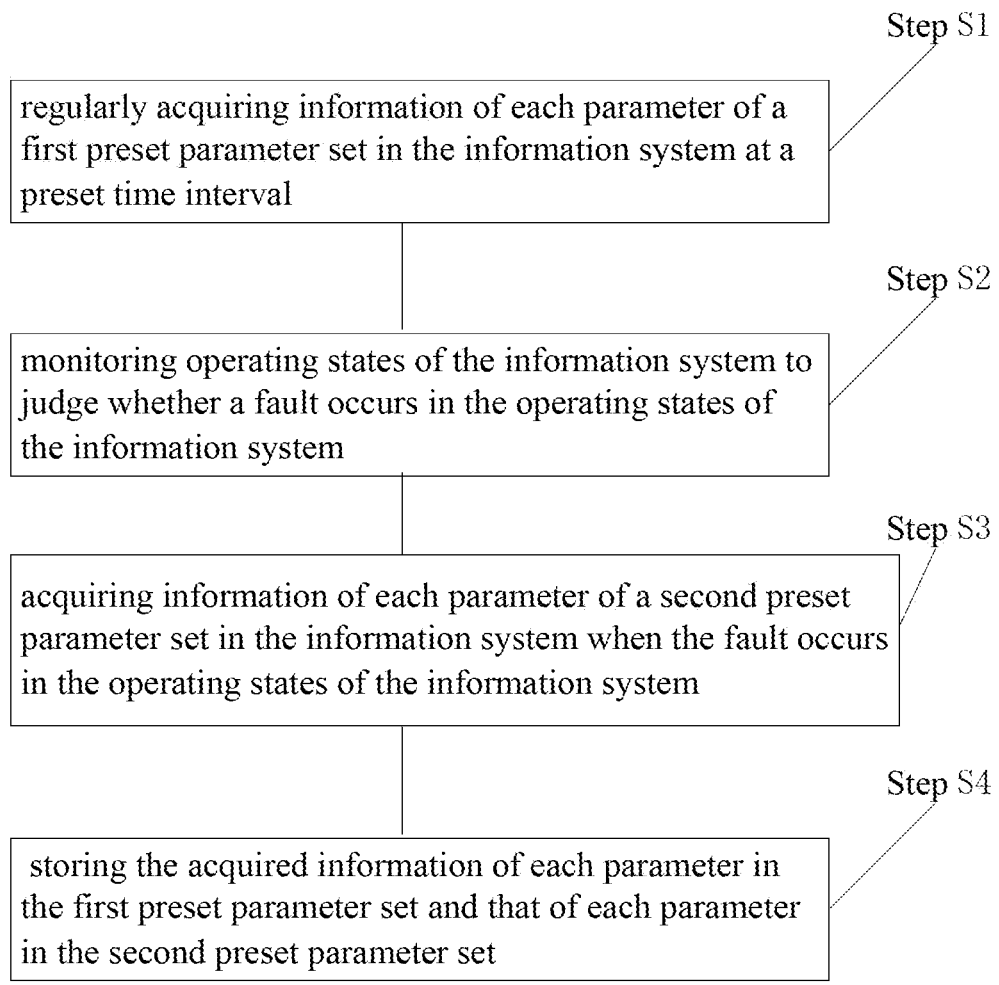
FIG. 2 is a schematic flow chart of the fault scenario information collecting method for information system provided by another embodiment of the present disclosure.

On any one of the above embodiments basis, in one example of the present disclosure, as shown in FIG. 2, the method further includes:

step S4: storing the acquired information of each parameter in the first preset parameter set and that of each parameter in the second preset parameter set for the operator of the information system to inquire and call the same.

It needs to explain that on the above embodiments basis, in one example of the present disclosure, the method further includes: before storing the acquired information of each parameter in the first preset parameter set and information of each parameter in the second preset parameter set, categorizing and reorganizing the acquired information of each parameter in the first preset parameter set and that of each parameter in the second preset parameter set, and then store them by categorization. The specific categorizing method may depend on its fault scenario type, or on other methods convenient to inquiry or analysis. The present disclosure does not limit the above but does it as appropriate.

In conclusion, the fault scenario information collecting method for the information system provided by the embodiments of the present disclosure acquires information of each parameter of the first preset parameter set in the information system at the preset time interval, and automatically acquires information of each parameter of the second preset parameter set in the information system when the fault occurs in the operating states of the information system, without manual intervention and waiting, which not only ensures that the fault scenario information may be collected immediately after the fault occurs and the fault scenario information is collected timely and comprehensively, so as to meet the demands of subsequently analyzing and locating the fault matters while reducing manual workload, but also avoiding the risks of manual misoperation in emergency circumstances.

Figure 3:
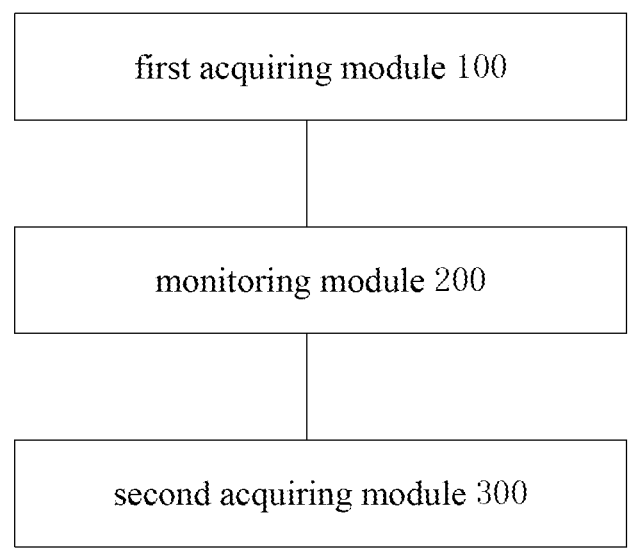
FIG. 3 is a structural drawing of the fault scenario information collecting system for the information system provided by one embodiment of the present disclosure.

Correspondingly, some embodiments of the present disclosure further provide a fault scenario information collecting system for an information system adopting the fault scenario information collecting method for the information system provided by any one of the above embodiments. As shown in FIG. 3, the fault scenario information collecting system for the information system provided by the embodiments of the present disclosure includes:

a first acquiring module 100 for regularly acquiring information of each parameter of the first preset parameter set in the information system at the preset time interval;

a monitoring module 200 for monitoring operating states of the information system to judge whether the fault occurs in the operating states of the information system;

second acquiring module 300 for acquiring information of each parameter of the second preset parameter set in the information system when the fault occurs in the operating states of the information system.

In the embodiments of the present disclosure, the first acquiring module 100 regularly acquires information of each parameter of the first preset parameter set in the information system at the preset time interval regardless of whether the fault occurs in the information system. In one specific example of the present disclosure, the first preset parameter set includes: operating system information and weblogic information and the like, wherein the operating system information includes: running process information, resource occupancy situation information, network card usage information and the number of the opened files corresponding to each system process in the information system; the weblogic information includes: service process information, garbage recycling log information, service log information, JVM information and the like. The present disclosure does not limit the above but does it as appropriate.

On any one of the above embodiments basis, in one preferable example of the present disclosure, the preset time interval ranges from 1 min to 5 min in terms of value, including end values. However, the present disclosure does not limit the above but does it as appropriate, as long as the preset time interval is smaller than the time interval from the time point when the fault occurs in the information system to the time point when the operation of the information system restarts, thereby ensuring that information of each parameter in the first preset parameter set at the fault occurring timing may be acquired when faults occurs in the information system.

Optionally, on any one of the above embodiments basis, in one example of the present disclosure, when the information system is in the operating states, the monitoring module 200 needs to fully monitor the operating states of the information system. Specifically, in one embodiment of the present disclosure, the monitoring module 200 includes:

a monitoring unit for monitoring operating states of the information system to judge whether abnormality occurs in the operating states of the information system;

an acquiring unit for acquiring information on the abnormality occurring in the information system when the abnormality occurs in the operating states of the information system;

a first judging unit for judging whether the information on the abnormality occurring in the information system satisfies the preset condition; and a second judging unit for determining that the fault occurs in the operating states of the information system when the information on the abnormality occurring in the information system satisfies the present condition, issuing alarm information to the second acquiring module 300, triggering the second acquiring module 300 to operate, and sending the monitored information of the abnormality to the second acquiring module 300.

It needs to explain that in the embodiments of the present disclosure, the preset condition may be whether the processor occupancy rate of the information system exceeds a threshold, or may be whether a key word exists in the incorrect log of the information system, and may be other judging conditions, or meanwhile include various judging conditions. The present disclosure does not limit the above but does it as appropriate.

On any one of the above embodiments basis, in one example of the present disclosure, the second acquiring module 300 includes:

an information matching unit for matching the information for the fault with the preset information to obtain the preset fault scenario type corresponding to the information for the fault when the fault occurs in the operating states of the information system, wherein various fault scenario types and their corresponding preset information are set in the information matching unit in advance, so as to rapidly determine the fault scenario type corresponding to the information for the fault by inquiring, according to the information on the abnormality, various fault scenario types and their corresponding preset information when the information matching unit receives the information on the abnormality sent by the monitoring module; and an information collecting unit for acquiring, according to the fault scenario type corresponding to the information for the fault, information of each parameter in the second preset parameter set corresponding to the fault scenario type.

On any one of the above embodiments basis, in one example of the present disclosure, the second preset parameter set includes: application log information and application configuration information and the like of the fault scenario type. The present disclosure does not limit the above but does it as appropriate. As in one specific example of the present disclosure, when the service downtime or failure of weblogic service port of the information system is monitored, the second preset parameter set includes: backup of the application log of the service port, whether dump (dump is used for showing a java thread pool performing a thread function calling relationship) occurs in the service port, backup dump file (saving the operating states of the system process, for debugging a driving program by a person who writes the driving program), and the like. The present disclosure does not limit the above but does it as appropriate.

It needs to explain that in the embodiments of the present disclosure, the parameter type in the second preset parameter set of different preset fault scenario types may be the same or different. The present disclosure does not limit the above but does it as appropriate to ensure that the information is collected in a targeted manner for the fault scenario type corresponding to the occurring fault, thereby realizing rapid and effective information collection for the fault.

On the above embodiments basis, in one example of the present disclosure, the second acquiring module 300 further includes: an information prompting unit for matching the fault information with the preset information, issuing the prompting information when no preset fault scenario type corresponding to the information for the fault is obtained, wherein the prompting information is used for prompting that there is no fault scenario type corresponding thereto in the current system and it fails to start the information collecting unit to automatically collect the information for this fault scenario.

On the above embodiments basis, in one example of the present disclosure, the second acquiring module 300 further includes:

an information supplement unit for collecting the information for a fault, to which no fault scenario type corresponding exists in the current system, when the fault occurs in the information system, summarizing and reorganizing the information for the current fault so as to be a new fault scenario type corresponding thereto, and adding it to the information matching unit, thereby supplementing the preset fault scenario types stored in the matching unit, timely and comprehensively collecting all fault scenario information possibly occurring in the information system as much as possible, and strongly supporting the subsequent analysis and location of the fault matters.

It needs to explain that in the embodiments of the present disclosure, when the fault occurs in the operating state of the information system, the acquisition of the parameter information of the first preset parameter set and that of the parameter information of the second preset parameter set may be performed concurrently, or successively. The present disclosure does not limit the above but does it as appropriate.

Figure 4:
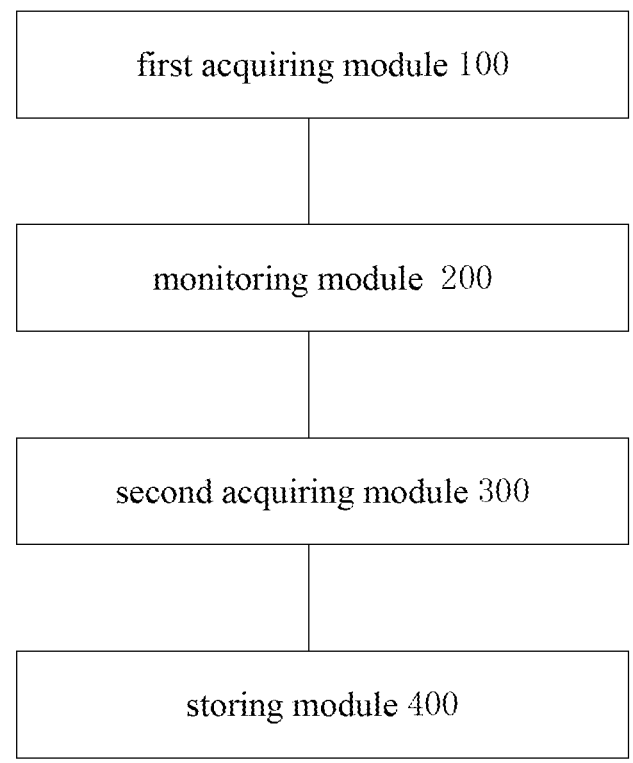
FIG. 4 is a structural drawing of the fault scenario information collecting system for the information system provided by another embodiment of the present disclosure.

On any one of the above embodiments basis, in one example of the present disclosure, as shown in FIG. 4, the fault scenario information collecting system further includes:

a storing module 400 for storing the acquired information of each parameter in the first preset parameter set and information of each parameter in the second preset parameter set for the operator of the information system to inquire and call the same.

It needs to explain that on the above embodiments basis, in one example of the present disclosure, the storing module 400 is further used for categorizing and reorganizing the acquired information of each parameter in the first preset parameter set and that of each parameter in the second preset parameter set, and then storing them by categorization. The specific categorizing method may depend on its fault scenario type, or on other methods convenient to inquiry or analysis. The present disclosure does not limit the above but does it as appropriate.

In conclusion, the fault scenario information collecting system for the information system provided by the embodiments of the present disclosure acquires, by the first acquiring module 100, information of each parameter of the first preset parameter set in the information system at a preset time interval, and automatically acquires, by the second acquiring module 300, information of each parameter of the second preset parameter set in the information system when the fault occurs in the operating states of the information system, without manual intervention and waiting, which not only ensures that the fault scenario information may be collected immediately after the fault occurs and the fault scenario information is collected timely and comprehensively, so as to meet the demands of subsequently analyzing and locating the fault matters while reducing manual workload, but also avoiding the risks of manual misoperation in emergency circumstances.

As understood by persons skilled in the art, the fault scenario information collecting system for the information system of each embodiment of the present specification may be implemented by the computer including a processor which is configured to execute the steps of the fault scenario information collecting method for the information system of each embodiment in the present specification. Alternatively, the fault scenario information collecting system for the information system may be implemented by a computer including a memory and a processor, the memory may stores the acquired information of each parameter in the first preset parameter set and that of each parameter in the second preset parameter set as the storing module 400 in the present disclosure and also stores programs which the processor executes so as to implement the steps of the fault scenario information collecting method for the information system in the present specification.

Each part of the present specification is described in a progressive manner, what focuses in each part is different from other parts, and the same or similar contents between each part may refer to each other.

The above explanation of the disclosed embodiments make persons skilled in the art realize or use the present disclosure. Various modifications to the embodiments are obvious to persons skilled in the art. The general principles defined herein may be implemented in other embodiments without departing from the spirit or range of the present disclosure. Therefore, the present disclosure is not limited to the embodiments shown herein, but to conform to the widest scope in line with the principles and novel features disclosed herein.

What is claimed is:

1. A fault scenario information collecting method for an information system, comprising:
   regularly acquiring information of each parameter of a first preset parameter set in the information system at a preset time interval, wherein the first preset parameter set includes operating system information and web-logic information, and the preset time interval is within a range between 1 min and 5 min, including end values;
   monitoring operating states of the information system based on the acquired information of each parameter of the first preset parameter set, so as to judge whether a fault occurs in the operating states of the information system;
   matching information of each parameter of the first preset parameter set acquired at a time of occurrence of the fault with a preset information to obtain a fault scenario type corresponding to the information of each parameter of the first preset parameter set acquired at a time of occurrence of the fault; and
   acquiring, according to the fault scenario type, information of each parameter of a second preset parameter set corresponding to the fault scenario type,
   wherein the second preset parameter set includes application log information and application configuration information of the fault scenario type.

2. The information collecting method according to claim 1, further comprising: adding a fault scenario type corresponding to the information of each parameter of the first preset parameter set acquired at a time of occurrence of the fault to which no preset fault scenario type corresponding is obtained.

3. The information collecting method according to claim 1, further comprising:
   storing the acquired information of each parameter of the first preset parameter set and that of each parameter of the second preset parameter set.

4. A fault scenario information collecting system for an information system, wherein the fault scenario information collecting system comprises a processor configured to:
   regularly acquire information of each parameter of a first preset parameter set in the information system at a preset time interval, wherein the first preset parameter set includes operating system information and web-logic information, and the preset time interval is within a range between 1 min and 5 min, including end values;
   monitor operating states of the information system based on the acquired information of each parameter of the first preset parameter set, so as to judge whether a fault occurs in the operating states of the information system;
   match the information of each parameter of the first preset parameter set acquired at a time of occurrence of the fault with a preset information to obtain a fault scenario type corresponding to the information of each parameter of the first preset parameter set acquired at a time of occurrence of the fault, wherein a plurality of fault scenario types and their corresponding preset information are set in an information matching unit in advance; and
   acquire, according to the fault scenario type, the information of each parameter of the second preset parameter set corresponding to the fault scenario type,
   wherein the second preset parameter set includes application log information and application configuration information of the fault scenario type.

5. The system according to claim 4, wherein the processor is further configured to:
   issue a prompting information when no preset fault scenario type corresponding to the information of each parameter of the first preset parameter set acquired at a time of occurrence of the fault is obtained, wherein the prompting information is used for prompting that there is no fault scenario type corresponding thereto in the system.

6. The system according to claim 5, wherein the processor is further configured to:
   collect information for the fault, to which no fault scenario type corresponds, in the system when the fault occurs in the information system; summarize and reorganize the information for the fault so as to be a new fault scenario type corresponding thereto, and add it to the information matching unit.

7. The system according to claim 4, wherein the processor is further configured to:
   store the acquired information of each parameter of the first preset parameter set and that of each parameter of the second preset parameter set.

* * * * *